(12) United States Patent
Mao

(10) Patent No.: US 10,827,182 B2
(45) Date of Patent: Nov. 3, 2020

(54) VIDEO ENCODING PROCESSING METHOD, COMPUTER DEVICE AND STORAGE MEDIUM

(71) Applicant: Tencent Technology (Shenzhen) Company Limited, Shenzhen (CN)

(72) Inventor: Xunan Mao, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/435,020

(22) Filed: Jun. 7, 2019

(65) Prior Publication Data

US 2019/0297327 A1  Sep. 26, 2019

Related U.S. Application Data

(63) Continuation of application No. PCT/CN2018/092573, filed on Jun. 25, 2018.

(30) Foreign Application Priority Data

Sep. 26, 2017 (CN) .......................... 2017 1 0880645

(51) Int. Cl.
*H04N 19/146* (2014.01)
*H04N 19/124* (2014.01)
(Continued)

(52) U.S. Cl.
CPC ............ *H04N 19/146* (2014.11); *H04N 7/14* (2013.01); *H04N 19/114* (2014.11);
(Continued)

(58) Field of Classification Search
None
See application file for complete search history.

(56) References Cited

U.S. PATENT DOCUMENTS

| 2009/0046778 A1* | 2/2009 | Lee ...................... H04N 19/124 |
| | | 375/240.03 |
| 2009/0097546 A1* | 4/2009 | Lee ...................... H04N 19/154 |
| | | 375/240.02 |

(Continued)

FOREIGN PATENT DOCUMENTS

| CN | 104869403 A | 8/2015 |
| CN | 106851272 A | 6/2017 |

(Continued)

OTHER PUBLICATIONS

Tencent Technology, ISR, PCT/CN2018/092573, Oct. 10, 2018, 2 pgs.

(Continued)

*Primary Examiner* — Kate H Luo
(74) *Attorney, Agent, or Firm* — Morgan, Lewis & Bockius LLP

(57) ABSTRACT

A video coding processing method performed by a computing device includes: obtaining a percentage of intra-prediction blocks in an inter-predicted frame in a previous group of video frame sequences; determining, according to the percentage, whether a current video scene changes, and determining a target bit rate of an intra-coded frame in a current group of video frame sequences according to the percentage when determining that the current video scene changes; and coding the intra-coded frame according to the target bit rate.

18 Claims, 6 Drawing Sheets

(51) Int. Cl.
*H04N 19/142* (2014.01)
*H04N 19/159* (2014.01)
*H04N 19/176* (2014.01)
*H04N 19/196* (2014.01)
*H04N 19/593* (2014.01)
*H04N 19/114* (2014.01)
*H04N 19/503* (2014.01)
*H04N 21/4788* (2011.01)
*H04N 7/14* (2006.01)

(52) U.S. Cl.
CPC ......... *H04N 19/124* (2014.11); *H04N 19/142* (2014.11); *H04N 19/159* (2014.11); *H04N 19/176* (2014.11); *H04N 19/196* (2014.11); *H04N 19/503* (2014.11); *H04N 19/593* (2014.11); *H04N 21/4788* (2013.01)

(56) References Cited

U.S. PATENT DOCUMENTS

| 2010/0073455 | A1* | 3/2010 | Iwabuchi | H04N 21/254 |
| | | | | 348/14.04 |
| 2011/0122942 | A1* | 5/2011 | Kudana | H04N 19/14 |
| | | | | 375/240.03 |
| 2012/0269258 | A1* | 10/2012 | Yang | H04N 19/172 |
| | | | | 375/240.02 |
| 2012/0281757 | A1* | 11/2012 | Roncero Izquierdo | |
| | | | | H04N 19/134 |
| | | | | 375/240.13 |
| 2014/0301460 | A1* | 10/2014 | Karczewicz | H04N 19/14 |
| | | | | 375/240.12 |
| 2015/0319437 | A1* | 11/2015 | Zhang | H04N 19/172 |
| | | | | 375/240.03 |

FOREIGN PATENT DOCUMENTS

| CN | 107027030 A | 8/2017 |
| JP | 2014090327 A | 5/2014 |

OTHER PUBLICATIONS

Tencent Technology, WO, PCT/CN2018/092573, Oct. 10, 2018, 4 pgs.
Tencent Technology, IPRP, PCT/CN2018/092573, Mar. 31, 2020, 5 pgs.

* cited by examiner

VIDEO ENCODING PROCESSING METHOD, COMPUTER DEVICE AND STORAGE MEDIUM

CROSS-REFERENCE TO RELATED APPLICATIONS

This application is a continuation application of PCT/CN2018/092573, entitled "VIDEO ENCODING PROCESSING METHOD, APPARATUS, AND DEVICE, AND STORAGE MEDIUM" filed on Jun. 25, 2018, which claims priority to Chinese Patent Application No. 201710880645.2, entitled "VIDEO ENCODING PROCESSING METHOD, APPARATUS, AND DEVICE, AND STORAGE MEDIUM" filed with the Patent Office of China on Sep. 26, 2017, all of which are incorporated by reference in their entirety.

FIELD OF THE TECHNOLOGY

This application relates to the field of computer technologies, and in particular, to a video coding processing method, a computing device, and a storage medium.

BACKGROUND OF THE DISCLOSURE

With the development of science and technology, methods for information transmission are becoming more and more diverse. Video has become a very important mode of information transmission because of its rich content, such as video calls or live broadcasting online. When information is transmitted through a video, the video needs to be coded.

At present, during video coding, a coding bit rate of a current intra-coded frame needs to be determined according to a bit rate or a quantization step of a video frame before the current intra-coded frame, so as to code the current intra-coded frame according to the coding bit rate.

However, image changes in a video are complex. The bit rate or quantization step of a video frame in a previous video frame sequence has little reference significance for coding bit rate allocation of the current intra-coded frame. Therefore, it is difficult to accurately determine the coding bit rate of the current intra-coded frame by using a conventional coding method. Consequently, an adaptive coding capability is relatively poor.

SUMMARY

According to embodiments provided in this application, a video coding processing method, a computing device, and a storage medium are provided.

According to a first aspect of this application, a video coding processing method is performed at a computing device having one or more processors and memory storing a plurality of programs to be executed by the one or more processors, the method comprising:

obtaining, by the computing device, a percentage of intra-prediction blocks in an inter-predicted frame in a previous group of video frame sequences;

determining, by the computing device according to the percentage, whether a current video scene changes;

in accordance with a determination that the current video scene changes, determining a target bit rate of an intra-coded frame in a current group of video frame sequences according to the percentage; and coding, by the computing device, the intra-coded frame according to the target bit rate.

According to a second aspect of this application, a computing device includes memory and one or more processors, the memory storing a plurality of computer readable instructions that, when executed by the one or more processors, cause the computing device to perform the aforementioned video coding processing method.

According to a third aspect of this application, a non-transitory computer readable storage medium stores a plurality of instructions in connection with a computing device having one or more processors. The plurality of instructions, when executed by the processor, cause the computing device to perform the aforementioned video coding processing method.

Details of one or more embodiments of this application are provided in the following accompanying drawings and descriptions. Other features, objectives, and advantages of this application become more obvious with reference to the specification, the accompanying drawings, and the claims.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make the objectives, technical solutions, and advantages of this application clearer and more comprehensible, the following further describes this application in detail with reference to the accompanying drawings and embodiments. It should be understood that the specific embodiments described herein are merely used to explain this application but are not intended to limit this application.

Figure 1:
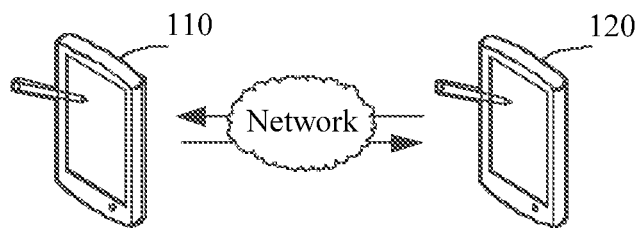
FIG. 1 is a diagram of an application environment of a video coding processing method in an embodiment.

FIG. 1 is a diagram of an application environment of a video coding processing method in an embodiment. Referring to FIG. 1, the application environment includes a first terminal 110 and a second terminal 120 that are connected by using a network. The first terminal 110 and the second terminal 120 have video coding and decoding functions. In an embodiment, video call applications may be installed on the first terminal 110 and the second terminal 120. The first terminal 110 or the second terminal 120 may be a desktop computer or a mobile terminal. The mobile terminal may include at least one of a mobile phone, a tablet computer, a personal digital assistant, a wearable device, and the like.

In an embodiment, the first terminal 110 and the second terminal 120 make a real-time video call by using the video call application. The first terminal 110 may obtain a percentage of intra-prediction blocks in an inter-predicted frame in a previous group of video frame sequences. The first terminal 110 may determine, according to the percentage, whether a current video scene changes, and determine a target bit rate of an intra-coded frame in a current group of video frame sequences according to the percentage when determining that the current video scene changes. The first terminal 110 may code the intra-coded frame according to the target bit rate. Further, the first terminal 110 may send a coded video stream obtained after coding to the second terminal 120 (that is, a video call peer end), and the second terminal 120 decodes and plays the received coded video stream.

It can be understood that multiparty video call can be implemented, and there may be at least one second terminal 120.

It should be noted that the diagram of the application environment shown in FIG. 1 may be merely an embodiment of the video coding processing method provided in this application. In other embodiments, the first terminal 110 may alternatively implement a network connection to the second terminal 120 by using a server. Namely, the first terminal 110 may send the coded video stream after coding to the server, and the server forwards the coded video stream to the second terminal 120.

It may be understood that the video coding processing method provided in this application is not only applicable to a video real-time call scene, but also applicable to an application environment in which a video is broadcast live online. The application environment includes a third terminal, a server, and a fourth terminal. The third terminal is configured to collect and send a video frame to the server. The server is configured to code the video frame and push a coded video stream after coding to the fourth terminal. The fourth terminal is configured to decode and play the coded video stream pushed by the server. Then, the video coding processing method provided in this application is applied to the server in the application environment in which a video is broadcast live online. The server in the application environment codes an intra-coded frame by using the video coding processing method provided in this application, to implement coding of a live video stream, and sends the coded video stream after coding to the fourth terminal for decoding and play.

It may be understood that the terms "first", "second", "third" and "fourth" are used only to distinguish expressions, without restrictions on other subordinates, rights, and orders.

Figure 2:
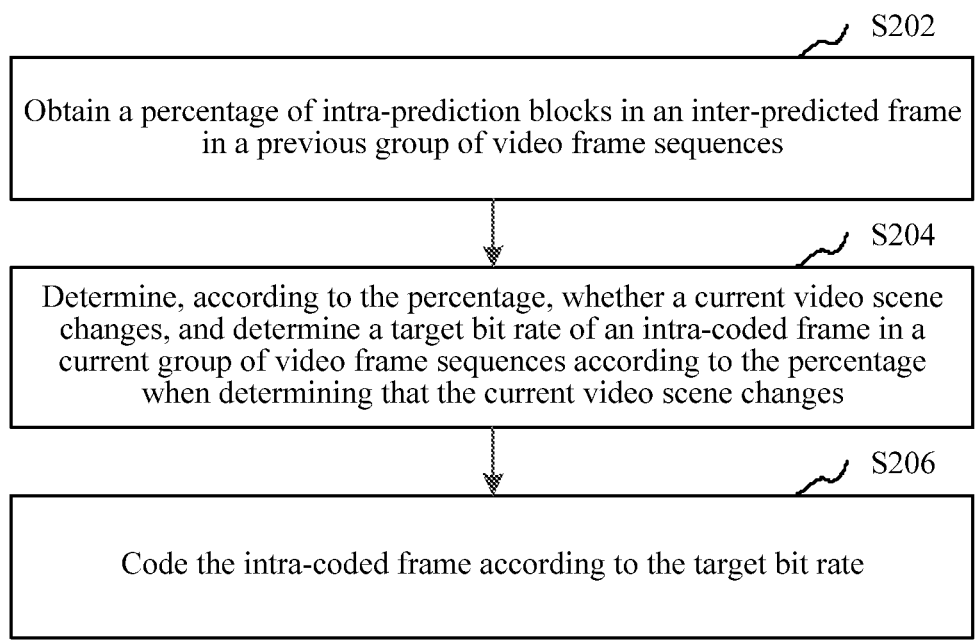
FIG. 2 is a schematic flowchart of a video coding processing method in an embodiment.

FIG. 2 is a schematic flowchart of a video coding processing method in an embodiment. In this embodiment, description is provided by mainly using an example in which the video coding processing method is applied to a computing device. The computing device may be the first terminal 110 or the second terminal 120 in FIG. 1, or may be the server in the application environment in which a video is broadcast live online. Referring to FIG. 2, the method specifically includes the following steps:

S202: Obtain a percentage of intra-prediction blocks in an inter-predicted frame in a previous group of video frame sequences.

The inter-predicted frame is a video frame that is coded by using a correlation between video image frames with reference to other video frames. The inter-predicted frame includes a predictive-coded picture (P frame) and/or a bidirectionally predicted picture (B frame).

A group of picture (GOP) is a group of video frame sequences starting from an intra-coded picture (I frame) and including an inter-predicted frame. The previous group of video frame sequences are a previous group of video frame sequences closest to the current group of video frame sequences. The current group of video frame sequences is video frame sequences that are to be coded currently.

Specifically, the computing device may select some or all inter-predicted frames from the previous group of video frame sequences. In an embodiment, the computing device may select an inter-predicted frame that is in the previous group of video frame sequences and that is closest to the current group of video frame sequences. The computing device may also determine a total quantity of inter-predicted frames in the previous group of video frame sequences, and select a plurality of continuous inter-predicted frames whose quantity is less than the total quantity from the previous group of video frame sequences in ascending order of distances from the current group of video frame sequences. For example, if the previous group of video frame sequences is ($I_{pre}$, P1, P2, B1, P3, P4), the computing device may select the closest P4 frame, or may select a plurality of continuous inter-predicted frames whose quantity is less than the total quantity 5 of the inter-predicted frames in the previous group of video frame sequences from the previous group of video frame sequences in ascending order of distances from the current group of video frame sequences. For example, three closest continuous inter-predicted frames P4, P3, and B1 are selected.

It may be understood that the computing device may also select inter-predicted frames that are not completely continuous from the previous group of video frame sequences. For example, the computing device may also select P1, B1, P3, and P4, where P1 and B1 are not continuous.

The intra-prediction block (Intra block) is a block coded by using an intra-frame coding mode in a frame. The intra-prediction block performs prediction by using pixels on the left edge and the upper edge of a pixel block by using a correlation between adjacent pixels, and only a difference between an actual value and a predicted value needs to be coded.

It may be understood that an inter-predicted frame of a frame consists of a plurality of blocks. The plurality of blocks that forms the inter-predicted frame includes an intra-prediction block and an inter-prediction block. The inter-prediction block (Inter block) is a block coded by using an inter-coding mode in a frame.

The percentage of the intra-prediction blocks is a proportion that intra-prediction blocks account for in all blocks that form a same inter-predicted frame. For example, a total of 30 blocks form an inter-predicted frame, and there are 10 intra-prediction blocks. The percentage of the intra-prediction blocks is $10/30=1/3$.

It may be understood that when a plurality of inter-predicted frames is selected in step S202, percentages of intra-prediction blocks in the inter-predicted frames need to be separately obtained.

S204: Determine, according to the percentage, whether a current video scene changes, and determine a target bit rate of an intra-coded frame in a current group of video frame sequences according to the percentage when determining that the current video scene changes.

The bit rate is a video bit rate, and is the quantity of data bits transmitted per unit time during data transmission.

The current video scene is a video scene at present. The video scene is presented by using an entire video image. A video scene change means that stability or density of a current video image changes. For example, if the current video scene changes from a static state to a moving state, it indicates that the stability of the current video image changes, and the current video scene changes; for another example, if a background of the current video scene changes from simple to complex, it indicates that the density of the current video image changes, and the current video scene changes.

In an embodiment, the computing device may determine, according to the percentage of the intra-prediction blocks, whether the current video scene changes. Specifically, the computing device may directly compare the obtained percentage of the intra-prediction blocks with a preset intra-prediction block percentage threshold, and determine, according to a comparison result, whether the current video scene changes.

In an embodiment, when the inter-predicted frames selected are a plurality of continuous inter-predicted frames, the determining, according to the percentage, whether a current video scene changes includes: determining the largest value and the smallest value of percentages of intra-prediction blocks in the inter-predicted frames; obtaining a plurality of preset intra-prediction block percentage thresholds; and determining that the current video scene changes when at least one of the intra-prediction block percentage thresholds exists between the largest value and the smallest value.

In an embodiment, the plurality of preset intra-prediction block percentage thresholds may be as follows, where Thre represents the intra-prediction block percentage threshold:

$$\begin{cases} Thre_1 = 0\% \\ Thre_2 = 5\% \\ Thre_3 = 10\% \\ Thre_4 = 20\% \\ Thre_5 = 50\% \\ Thre_6 = 100\% \end{cases}$$

How to determine, with reference to the plurality of preset intra-prediction block percentage thresholds, that the current video scene changes is explained now. For example, if the largest value and the smallest value in the percentages are respectively 15% and 8%, and an intra-prediction block percentage threshold 10% ($Thre_3$) exists between the largest value 15% and the smallest value 8%, it is determined that the current video scene changes.

In an embodiment, the determining, according to the percentage, whether a current video scene changes further includes: determining whether the largest value and the smallest value are between adjacent two of the intra-prediction block percentage thresholds; and determining that the current video scene does not change when the largest value and the smallest value are between adjacent two of the intra-prediction block percentage thresholds.

An example is also described with reference to the plurality of preset intra-prediction block percentage thresholds. For example, if the largest value and the smallest value in the percentages are respectively 8% and 6%, and the largest value 8% and the smallest value 6% are between adjacent two intra-prediction block percentage thresholds, namely, 5% ($Thre_2$) and 10% ($Thre_3$), it is determined that the current video scene does not change.

It may be understood that when there is one inter-predicted frame selected, there is one obtained percentage of the intra-prediction blocks. Specifically, the computing device may directly determine, according to the distribution location and distribution trend of each intra-prediction block in the inter-predicted frame, and the size of the percentage of the intra-prediction blocks, whether the current video scene changes.

Specifically, the computing device may determine, according to the percentage itself, a target bit rate of an intra-coded frame in a current group of video frame sequences when determining, according to the percentage, that the current video scene changes.

In an embodiment, when there is one inter-predicted frame selected, there is only one obtained percentage of the intra-prediction blocks. The computing device may obtain a preset bit rate correspondingly mapping the percentage as the target bit rate of the intra-coded frame in the current group of video frame sequences according to a mapping relationship between a percentage and a preset bit rate.

In another embodiment, when there is a plurality of inter-predicted frames selected, there is also a plurality of obtained percentages of the intra-prediction blocks. The computing device may determine the target bit rate of the intra-coded frame in the current group of video frame sequences according to an average value of the plurality of percentages. The computing device may also select some percentages from the plurality of percentages, and determine the target bit rate of the intra-coded frame in the current group of video frame sequences according to an average value of the selected percentages. In an embodiment, the computing device may also select a percentage of intra-prediction blocks in an inter-predicted frame closest to the current group of video frame sequences, and according to the percentage, determine the target bit rate of the intra-coded frame in the current group of video frame sequences.

S206: Code the intra-coded frame according to the target bit rate.

Specifically, the computing device may code the intra-coded frame in the current group of video frame sequences according to the determined target bit rate of the intra-coded frame in the current group of video frame sequences.

In the foregoing embodiment, when the intra-coded frame in the current group of video frame sequences is coded, whether the current video scene changes is determined according to the percentage of the intra-prediction blocks in the inter-predicted frame selected in the previous group of video frame sequences. When it is determined that the current video scene changes, the target bit rate of the intra-coded frame in the current group of video frame sequences is determined according to the percentage of the intra-prediction blocks. The percentage of the intra-prediction blocks can reflect the strength of a correlation between images, and target bit rate allocation of the intra-coded frame in the current group of video frame sequences is determined according to the percentage of the intra-prediction blocks that can reflect the strength of the correlation between images, so that when the current video scene changes, the target bit rate allocation for the intra-coded frame in the current group of video frame sequences is more accurate, thereby improving adaptive coding capabilities.

In an embodiment, the inter-predicted frames selected are a plurality of continuous inter-predicted frames. The determining a target bit rate of an intra-coded frame in a current group of video frame sequences according to the percentage when determining that the current video scene changes includes: determining an average value of percentages of intra-prediction blocks in the inter-predicted frames when determining, according to the percentage, that the current video scene changes; and determining the target bit rate of the intra-coded frame in the current group of video frame sequences according to the average value of the percentages, the target bit rate being in negative correlation with the average value of the percentages.

The average value of the percentages may be an arithmetic average value, or may be a weighted average value. In an embodiment, the computing device may allocate corresponding weights to the inter-predicted frames according to sizes of distances between the inter-predicted frames selected and the current group of video frame sequences. Weights are in inverse correlation with the distances from the current group of video frame sequences. A smaller distance from the current group of video frame sequences (namely, nearer) corresponds to a larger weight, and a larger distance from the current group of video frame sequences (namely, farther) corresponds to a smaller weight.

In an embodiment, the computing device may obtain a preset bit rate mapping the determined average value of the percentages as the target bit rate of the intra-coded frame in the current group of video frame sequences according to a mapping relationship between the average value of the percentages and the preset bit rate. The target bit rate is in negative correlation with the average value of the percentages.

In another embodiment, the computing device may also determine a ratio of the target bit rate of the intra-coded frame in the current group of video frame sequences to a single frame average bit rate according to the average value of the percentages, the ratio being in negative correlation with the average value of the percentages; obtain the single frame average bit rate; and obtain the target bit rate of the intra-coded frame according to the single frame average bit rate and the ratio.

The single frame average bit rate is an average bit rate of a frame. In an embodiment, an encoder may be disposed in the computing device, and a video frame is coded by using the encoder. A coding parameter is preset in the encoder. The coding parameter includes a target bit rate per second and a frame rate, and the coding parameter may also include a single frame average bit rate. In an embodiment, a single frame average bit rate may be preset in the encoder, and the computing device may obtain the preset single frame average bit rate. In another embodiment, a target bit rate per second and a frame rate may be preset in the encoder. The computing device may obtain the preset target bit rate per second and frame rate, and divide the target bit rate per second by the frame rate, to obtain the single frame average bit rate.

In an embodiment, the computing device may obtain a preset ratio mapping the average value of the percentages as the ratio of the target bit rate of the intra-coded frame in the previous group of video frame sequences to the single frame average bit rate according to a mapping relationship between the average value of the percentages and the preset ratio. The ratio is in negative correlation with the average value of the percentages. The computing device may obtain the target bit rate of the intra-coded frame n the previous group of video frame sequences according to a product of the ratio and the obtained single frame average bit rate.

In the foregoing embodiment, the average value of the percentages of the intra-prediction blocks in the inter-predicted frames is determined when it is determined, according to the percentage, that the current video scene changes. The average value of the percentages can reflect strength of a correlation between images. If the average value of the percentages is relatively small, the scene is usually a static scene, and the correlation between images is relatively strong, and if the average value of the percentages is relatively large, the scene is usually a moving scene, and the correlation between images is relatively weak. The target bit rate of the intra-coded frame in the current group of video frame sequences is determined according to the average value of the percentages, the target bit rate being in negative correlation with the average value of the percentages. It may be understood that when the average value of the percentages is relatively small and the correlation between images is relatively strong, a bit rate required by the inter-predicted frame is relatively low. In this case, the bit rate of the intra-coded frame may be improved, to facilitate improving the entire compression efficiency of the video. When the average value of the percentages is relatively large, and the correlation between images is relatively weak, the bit rate required by the inter-predicted frame is relatively high. In this case, the bit rate of the intra-coded frame may be reduced.

In an embodiment, step S202 includes: obtaining a target selection quantity; selecting continuous inter-predicted frames that meet the target selection quantity from the previous group of video frame sequences in ascending order of distances from the current group of video frame sequences; and obtaining percentages of intra-prediction blocks in the inter-predicted frames.

The target selection quantity is a target quantity of inter-predicted frames that need to be selected. In an embodiment, the target selection quantity may be a preset selection quantity.

In another embodiment, the obtaining a target selection quantity includes: determining a total quantity of inter-predicted frames in the previous group of video frame sequences; obtaining a preset selection quantity; and determining the smaller one of the preset selection quantity and the determined total quantity as the target selection quantity.

The total quantity of the inter-predicted frames in the previous group of video frame sequences is a total quantity of all inter-predicted frames in the previous group of video frame sequences. The preset selection quantity is a preset quantity of inter-predicted frames that need to be selected.

Specifically, the computing device may determine the smaller one in the preset selection total quantity and the determined quantity as the target selection quantity. It may be understood that the manner of selecting the smaller value in this embodiment can prevent a selection error problem caused when the total quantity of the inter-predicted frames in the previous group of video frame sequences is less than the preset selection quantity, thereby enhancing the flexibility and stability of the system.

In the foregoing embodiment, continuous inter-predicted frames that meet the target selection quantity are selected from the previous group of video frame sequences in ascending order of distances from the current group of video frame sequences, so that states of the inter-predicted frames selected have stronger association with the intra-coded frames of the current group of video frame sequences, thereby more accurately reflecting the target bit rate required by the intra-coded frame in the current video scene.

In an embodiment, the determining a ratio of the target bit rate of the intra-coded frame in the current group of video frame sequences to a single frame average bit rate according to the average value of the percentages includes: determining a phase corresponding to the average value of the percentages in a decreasing preset phase function; obtaining a preset ratio corresponding to the determined phase; and determining the obtained preset ratio as the ratio of the target bit rate of the intra-coded frame in the current group of video frame sequences to the single frame average bit rate.

The phase function is a function that has different correspondence rules for different value intervals of an independent variable. The correspondence rule is used to indicate the dependency relationship between independent variables and dependent variables. For example, y=f(x) indicates that a variable y is a function of a variable x, where f represents the correspondence rule between the variable y and the variable x. The independent variables of the phase function have the same correspondence rule in the same value interval, and the independent variables of different value intervals have different correspondence rules. It may be understood that the phase function includes a plurality of limited phases. Each phase of the phase function is divided according to value intervals of independent variables, and a value interval of a same independent variable corresponds to a phase.

The decreasing preset phase function is a preset decreasing phase function. The different value intervals of the independent variables in the phase function are compared with each other. The larger independent variable value interval upon comparison has a smaller function value corresponding to the corresponding phase in the decreasing phase function. It may be understood that for the phase function, any value of the independent variable in the larger value interval is greater than that in the smaller value interval. For example, a value interval 1 is greater than or equal to 0 and less than 5%, and a value interval 2 is greater than or equal to 5% and less than 10%, then the value interval 2 is greater than the value interval 1, and any value in the value interval 2 is greater than the value of the independent variable in the value interval 1.

Specifically, the computing device may determine the phase corresponding to the average value of the percentages in the preset phase function according to a preset mapping function between the average value of the percentages and a preset phase quantity of phases. For example, when the average value of the percentages is 8%, the average value corresponds to a second phase in the preset phase function.

Further, the computing device may obtain a preset ratio corresponding to the determined phase, and determine the obtained preset ratio as the ratio of the target bit rate of the intra-coded frame in the current group of video frame sequences to the single frame average bit rate. In an embodiment, the computing device may obtain a preset correspondence between phases and preset ratios, and obtain a preset ratio corresponding to the phase. For example, the preset ratio corresponding to the second phase is 5:1.

In another embodiment, the phase function is a piecewise constant function. Function values of the piecewise constant function are a plurality of constants. Independent variables of a same value interval correspond to a same constant function value, and independent variables of different value intervals correspond to different constant function values. It may be understood that the different value intervals of the independent variables in the phase function are compared with each other. The larger independent variable value interval upon comparison has a smaller constant function value corresponding to the corresponding phase in the decreasing piecewise constant function. In this embodiment, the constant function value in each phase of the piecewise constant function is a preset ratio corresponding to the phase.

In the foregoing embodiment, by determining the phase corresponding to the average value of the percentages in the decreasing preset phase function, obtaining the preset ratio corresponding to the determined phase, and determining the obtained preset ratio as the ratio of the target bit rate of the intra-coded frame in the current group of video frame sequences to the single frame average bit rate without performing complex calculation, the ratio of the target bit rate of the intra-coded frame in the current group of video frame sequences to the single frame average bit rate can be quickly and accurately determined, to quickly determine the target bit rate, thereby improving the video coding efficiency.

Figure 3:
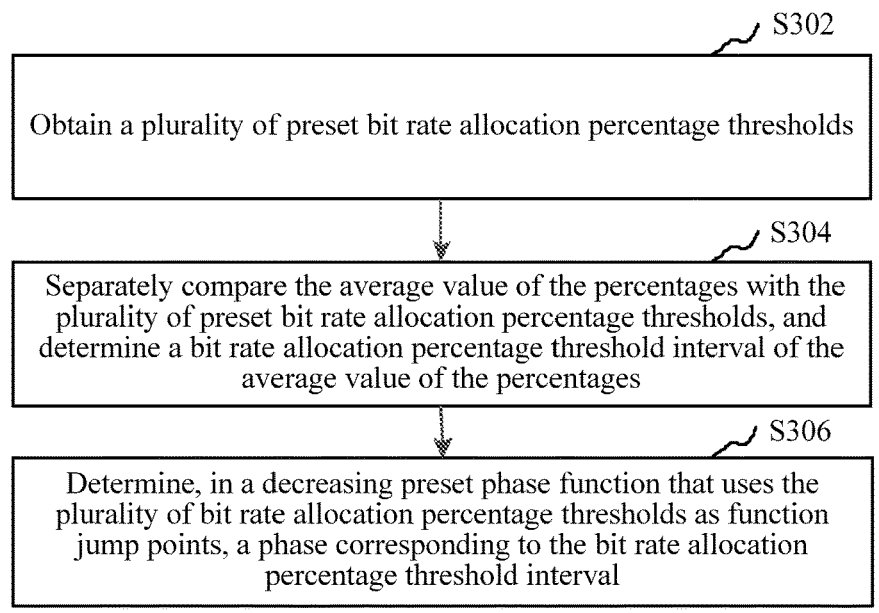
FIG. 3 is a schematic flowchart of a phase determining step in an embodiment.

As shown in FIG. 3, in an embodiment, the determining a phase corresponding to the average value of the percentages in a decreasing preset phase function (briefly referred to as a phase determining step) specifically includes the following steps:

S302: Obtain a plurality of preset bit rate allocation percentage thresholds.

The bit rate allocation percentage threshold is a preset percentage threshold for implementing bit rate allocation. It should be noted that the bit rate allocation percentage threshold may be set to a value the same as the intra-prediction block percentage threshold, or a value different from the intra-prediction block percentage threshold.

In an embodiment, the plurality of preset bit rate allocation percentage thresholds may be as follows, where TH represents the bit rate allocation percentage threshold:

$$\begin{cases} Th_1 = 0\% \\ Th_2 = 5\% \\ Th_3 = 15\% \\ Th_4 = 40\% \\ Th_5 = 100\% \end{cases}$$

S304: Separately compare the average value of the percentages with the plurality of preset bit rate allocation percentage thresholds, and determine a bit rate allocation percentage threshold interval of the average value of the percentages.

The bit rate allocation percentage threshold interval is an interval formed by every two-bit rate allocation percentage thresholds adjacent in size. It may be understood that bit rate allocation percentage thresholds included between different bit rate allocation percentage thresholds are not repetitive. A bit rate allocation percentage threshold at a critical position includes only one-bit rate allocation percentage threshold interval. A current bit rate allocation percentage threshold interval includes the bit rate allocation percentage threshold at the critical position, and then a next bit rate allocation percentage threshold interval does not include the bit rate allocation percentage threshold at the critical position For example, 5% ($TH_2$) is a bit rate allocation percentage threshold at a critical position. When a bit rate allocation percentage threshold interval 1 is greater than or equal to 0 and less than 5%, a bit rate allocation percentage threshold interval 2 includes the bit rate allocation percentage threshold, namely, 5%, and the bit rate allocation percentage threshold interval 2 is greater than or equal to 5% and less than 15%.

The bit rate allocation percentage threshold interval of the average value of the percentages is explained now by using a bit rate allocation percentage threshold shown in an embodiment in step S302 as an example. It is assumed that the average value of the percentages is 30%, the bit rate allocation percentage threshold intervals are respectively greater than or equal to 0 and less than 5%, greater than or equal to 5% and less than 15%, greater than or equal to 15% and less than 40%, and greater than or equal to 40% and less than 100%. The average value 30% of the percentages is in the bit rate allocation percentage threshold interval greater than or equal to 15% and less than 40%.

S306: Determine, in a decreasing preset phase function that uses the plurality of bit rate allocation percentage thresholds as function jump points, a phase corresponding to the bit rate allocation percentage threshold interval.

The function jump points of the phase function are points that divide the phase function into phases. Two function jump points adjacent in size correspond to a phase of the phase function.

It may be understood that the bit rate allocation percentage threshold interval formed by every two-bit rate allocation percentage thresholds adjacent in size corresponds to phases corresponding to the preset phase function that uses the plurality of bit rate allocation percentage thresholds as the function jump points. Namely, a bit rate allocation percentage threshold interval has corresponding phases in the preset phase function.

In an embodiment, the bit rate allocation percentage threshold interval formed by every two-bit rate allocation percentage thresholds adjacent in size corresponds to a phase formed by the bit rate allocation percentage thresholds that form the interval and that are used as the function jump points.

Specifically, the computing device may preset the preset phase function that uses the plurality of preset bit rate allocation percentage thresholds as the function jump points. The preset phase function is a decreasing phase function. The computing device may obtain bit rate allocation percentage thresholds that form the bit rate allocation percentage threshold interval, and determine a phase formed by the obtained bit rate allocation percentage thresholds as the function jump points, to obtain a phase corresponding to the bit rate allocation percentage threshold interval.

In an embodiment, the decreasing preset phase function that uses the plurality of bit rate allocation percentage thresholds as the function jump points is as follows. X is an independent variable, Y is a dependent variable of the function, and TH represents the bit rate allocation percentage threshold:

$$Y = \begin{cases} 7, & TH_1 \leq X < TH_2 \\ 5, & TH_2 \leq X < TH_3 \\ 3.5, & TH_3 \leq X < TH_4 \\ 2, & TH_4 \leq X < TH_5 \end{cases}$$

Now how to determine a phase is explained now by using a bit rate allocation percentage threshold shown in an embodiment in step S302 as an example. Assuming that the bit rate allocation percentage threshold interval of the determined average value 15% of the percentages is greater than or equal to 15% and less than 40%, a phase corresponding to the bit rate allocation percentage threshold phase is a third phase. A preset ratio (namely, a function value) corresponding to the third phase is 3. The preset ratio 3 is used as the ratio of the target bit rate of the intra-coded frame in the current group of video frame sequences to the single frame average bit rate.

In the foregoing embodiment, the decreasing preset phase function that uses the plurality of bit rate allocation percentage thresholds as the function jump points is set. During actual calculation, the average value of the percentages only needs to be simply compared with the plurality of bit rate allocation percentage thresholds, to determine the corresponding bit rate allocation percentage threshold interval, and a corresponding phase in the preset phase function may be quickly determined according to the interval, thereby quickly determining the ratio of the target bit rate of the intra-coded frame in the current group of video frame sequences to the single frame average bit rate, to quickly obtain the target bit rate, and improve the video coding efficiency.

In an embodiment, the method further includes: obtaining an average quantization parameter of the inter-predicted frame of the previous group of video frame sequences when determining, according to the percentage, that the current video scene does not change; determining a quantization parameter of the intra-coded frame in the current group of video frame sequences according to the average quantization parameter and a preset quantization parameter offset; and coding the intra-coded frame according to the quantization parameter.

The quantization parameter reflects a space detail compression status. If the QP is relatively small, most of details are reserved, and if the QP increases, some details are lost, the bit rate decreases, image distortion increases, and quality decreases. The average quantization parameter of the inter-predicted frame is an average quantization parameter obtained by averaging quantization parameters of the inter-predicted frames of the previous group of video frame sequences. The quantization parameter offset is an offset required by the quantization parameter.

Specifically, the computing device may subtract the preset quantization parameter offset from the average quantization parameter, to obtain the quantization parameter of the intra-coded frame in the current group of video frame sequences. The computing device may code the intra-coded frame according to the quantization parameter.

In the foregoing embodiment, when the current video scene does not change, the average quantization parameter of the inter-predicted frame in the previous group of video frame sequences has relatively accurate reference significance. Therefore, the quantization parameter that is of the intra-coded frame in the current group of video frame sequences and that is determined based on the average quantization parameter and the quantization parameter offset of the inter-predicted frame in the previous group of video frame sequences can meet a requirement of a current video bit rate, thereby coding the intra-coded frame according to the quantization parameter, and ensuring the video coding quality.

Figure 4:
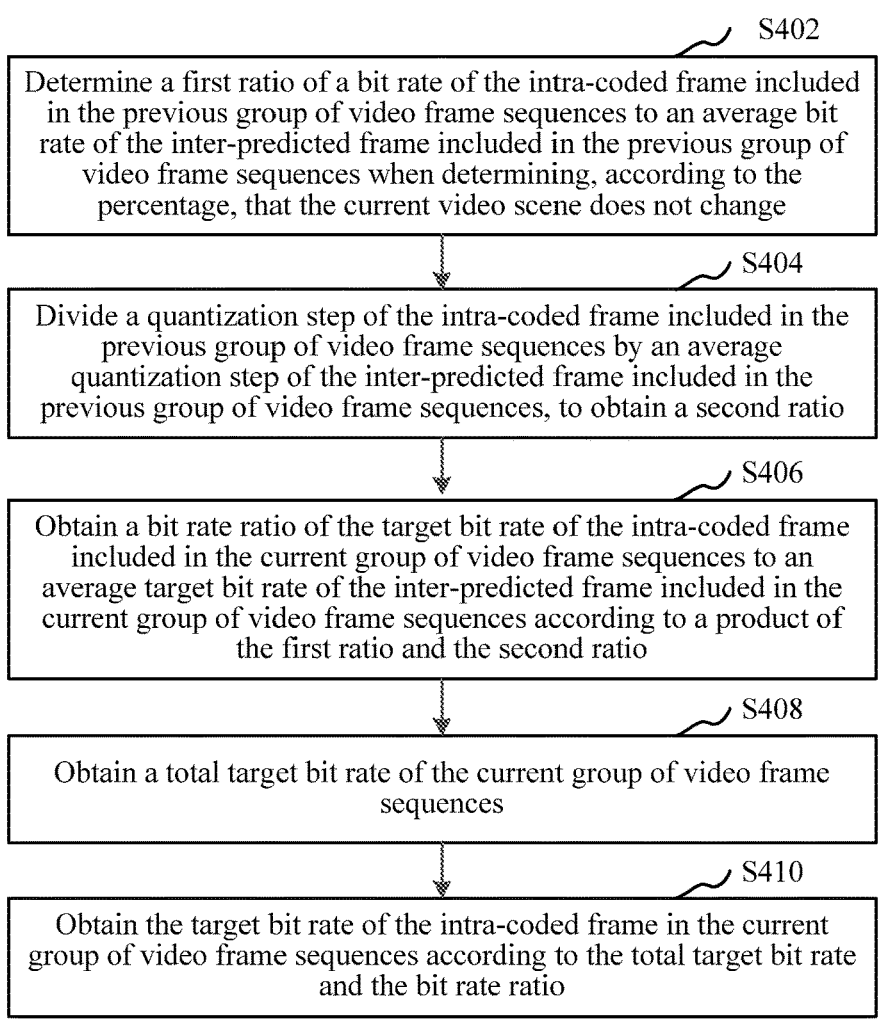
FIG. 4 is a schematic flowchart of a target bit rate determining step in an embodiment.

As shown in FIG. 4, in an embodiment, the method further includes a target bit rate determining step, specifically including the following steps:

S402: Determine a first ratio of a bit rate of the intra-coded frame included in the previous group of video frame sequences to an average bit rate of the inter-predicted frame included in the previous group of video frame sequences when determining, according to the percentage, that the current video scene does not change.

It may be understood that when the current group of video frame sequences is coded, coding of video frames of the previous group of video frame sequences is already completed, and the coding bit rate is already determined. The computing device may obtain the bit rate of the intra-coded frame included in the previous group of video frame sequences and the average bit rate of the inter-predicted frame included in the previous group of video frame sequences, and divide the bit rate of the included intra-coded frame by the average bit rate of the included inter-predicted frame to obtain the first ratio.

S404: Divide a quantization step of the intra-coded frame included in the previous group of video frame sequences by an average quantization step of the inter-predicted frame included in the previous group of video frame sequences, to obtain a second ratio.

Quantization is a process of performing transform mapping on data of a to-be-compressed image. The quantization step is an element involved when quantization and dequantization are performed on an input image. The size of the quantization step is in positive correlation with a difference between an input image before quantization and an output image after quantization and dequantization. A smaller quantization step indicates a larger similarity between the output image after quantization and dequantization and the input image before quantization. Namely, the quantization step affects the video compression quality.

It may be understood that when the current group of video frame sequences is coded, coding of video frames of the previous group of video frame sequences is already completed, and the quantization step of each frame in the previous group of video frame sequences is already determined. The computing device obtain the quantization step of the inter-predicted frame included in the previous group of video frame sequences, and calculate the average quantization step of the inter-predicted frames. The computing device may obtain the quantization step of the intra-coded frame included in the previous group of video frame sequences, and divide the quantization step of the included intra-coded frame by the average quantization step of the included inter-predicted frame, to obtain the second ratio.

S406: Obtain a bit rate ratio of the target bit rate of the intra-coded frame included in the current group of video frame sequences to an average target bit rate of the inter-predicted frame included in the current group of video frame sequences according to a product of the first ratio and the second ratio.

Specifically, the computing device may directly use the product of the first ratio and the second ratio as the bit rate ratio of the target bit rate of the intra-coded frame included in the current group of video frame sequences to the average target bit rate of the inter-predicted frame included in the current group of video frame sequences. The computing device may also multiply the product of the first ratio and the second ratio by a corresponding bit rate ratio adjustment coefficient, to obtain the bit rate ratio of the target bit rate of the intra-coded frame included in the current group of video frame sequences to the average target bit rate of the inter-predicted frame included in the current group of video frame sequences.

S408: Obtain a total target bit rate of the current group of video frame sequences.

It may be understood that a coding parameter is preset in the computing device, and the coding parameter includes a total bit rate of a group of video frame sequences. The computing device may obtain the preset total bit rate as the total target bit rate of the current group of video frame sequences.

S410: Obtain the target bit rate of the intra-coded frame in the current group of video frame sequences according to the total target bit rate and the bit rate ratio.

It may be understood that the bit rate ratio is the ratio of the target bit rate of the intra-code frame included in the current group of video frame sequences to the average target bit rate of the inter-predicted frame included in the current group of video frame sequences.

Specifically, the computing device may obtain a quantity of inter-predicted frames in the current group of video frame sequences, and obtain the target bit rate of the intra-coded frame in the current group of video frame sequences according to the quantity, the total target bit rate, and the bit rate ratio.

It may be understood that the total target bit rate is a sum of the target bit rate of the intra-coded frame included in the current group of video frame sequences and the target bit rate of the inter-predicted frame included in the current group of video frame sequences.

In an embodiment, the computing device may obtain the target bit rate of the intra-coded frame in the current group of video frame sequences according to the following formula:

$$C_T = C_I + \sum_{i=1}^{n} CJ_i$$

$$R = C_I \bigg/ \frac{\sum_{i=1}^{n} CJ_i}{n}$$

$C_T$ is the total target bit rate of the current group of video frame sequences, $C_I$ is the target bit rate of the intra-coded frame of the current group of video frame sequences, $CJ_i$ if the target bit rate of the inter-predicted frames of the current group of video frame sequences, n is a quantity of the inter-predicted frames in the current group of video frame sequences, and R is the bit rate ratio of the target bit rate of the intra-coded frame included in the current group of video frame sequences to the bit rate ratio of the average target bit rate of the inter-predicted frame included in the current group of video frame sequences.

It may be understood that the computing device may code the intra-coded frame in the current group of video frame sequences according to the obtained target bit rate of the intra-coded frame in the current group of video frame sequences.

In the foregoing embodiment, when the current video scene does not change, the bit rate and quantization step of each frame in the previous group of video frame sequences have relatively accurate reference significance. Therefore, the target bit rate that is of the intra-coded frame in the current group of video frame sequences and that is obtained based on the bit rate and quantization step of each frame in the previous group of video frame sequences can be relatively accurate, to ensure the video coding quality.

In an embodiment, the current group of video frame sequences are video frame sequences obtained by using a video call application. The method further includes: sending, by using the video call application, a coded video stream obtained after coding to a video call peer end for decoding and play.

It may be understood that a video call application is installed in the computing device, to implement a video real-time call. In a video real-time call process, as a video stream sending end, the computing device may collect a video frame sequence in real time by using the video call application, and code the collected video frame sequence. After coding the intra-coded frame in the current group of video frame sequences according to the determined target bit rate, the computing device may send the coded video stream after coding to a video call peer end by using the video call application. There is at least one video call peer end. The video call peer end that receives the coded video stream may decode the coded video stream, and play the decoded video stream.

In the foregoing embodiment, the computing device obtains the current group of video frame sequences by using the video call application, and determines the target bit rate of the current group of video frame sequences according to the percentage of the intra-prediction blocks in the inter-predicted frame in the previous group of video frame sequences, and performs coding on this basis. The computing device sends, by using the video call application, the coded video stream that is coded according to the foregoing method to the video call peer end for decoding and play, so that adaptive coding capabilities of the video real-time call are stronger, thereby improving the quality of the video real-time call.

Figure 5:
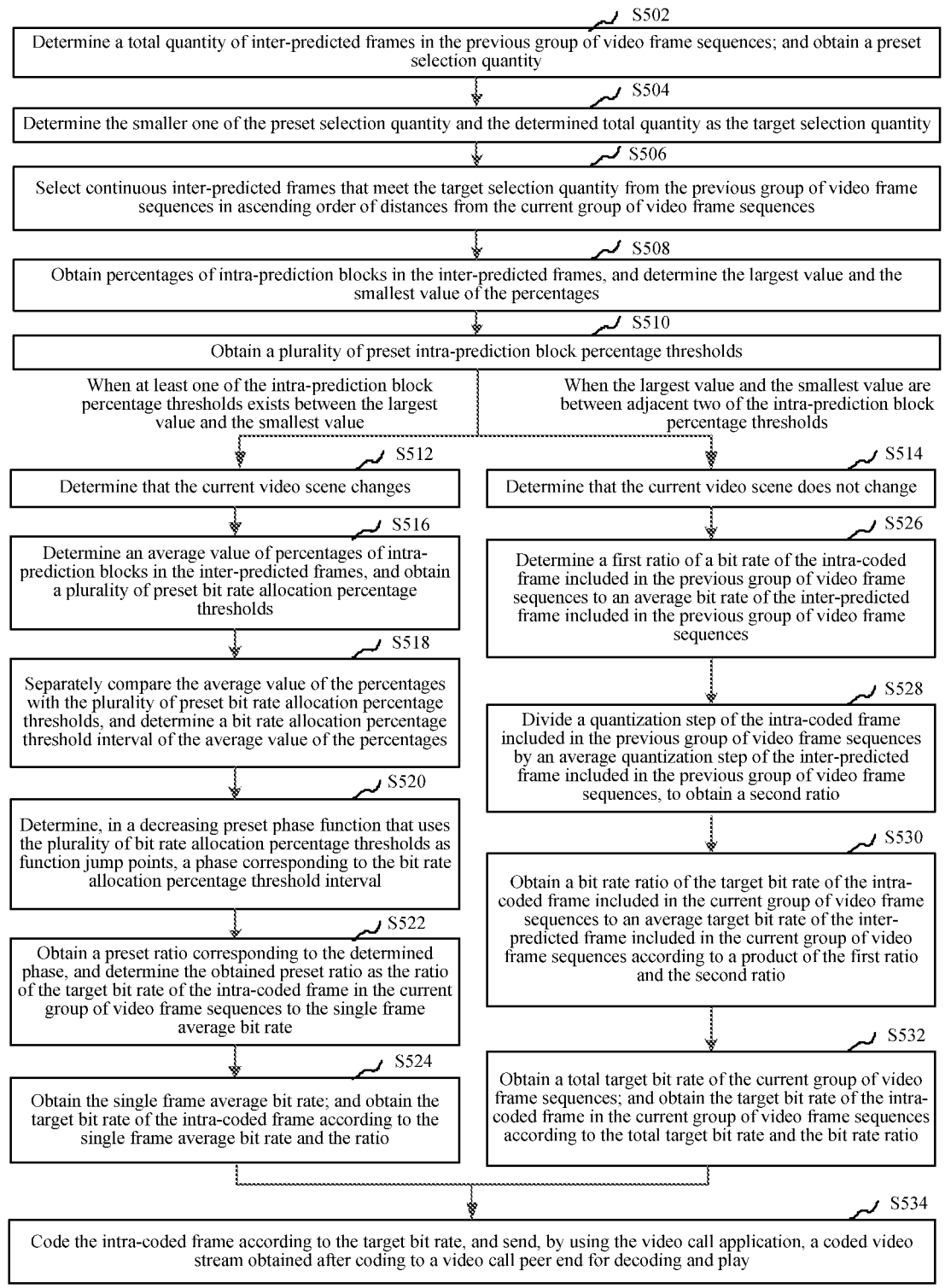
FIG. 5 is a schematic flowchart of a video coding processing method in another embodiment.

As shown in FIG. 5, in an embodiment, another video coding processing method is provided. The method specifically includes the following steps:

S502: Determine a total quantity of inter-predicted frames in the previous group of video frame sequences; and obtain a preset selection quantity.

S504: Determine the smaller one of the preset selection quantity and the determined total quantity as the target selection quantity.

S506: Select continuous inter-predicted frames that meet the target selection quantity from the previous group of video frame sequences in ascending order of distances from the current group of video frame sequences.

The current group of video frame sequences are video frame sequences obtained by using a video call application.

S508: Obtain percentages of intra-prediction blocks in the inter-predicted frames, and determine the largest value and the smallest value of the percentages.

S510: Obtain a plurality of preset intra-prediction block percentage thresholds.

S512: Determine that the current video scene changes when at least one of the intra-prediction block percentage thresholds exists between the largest value and the smallest value, and proceed to step S516.

S514: Determine that the current video scene does not change when the largest value and the smallest value are between adjacent two of the intra-prediction block percentage thresholds, and proceed to step S526.

S516: Determine an average value of percentages of intra-prediction blocks in the inter-predicted frames, and obtain a plurality of preset bit rate allocation percentage thresholds.

S518: Separately compare the average value of the percentages with the plurality of preset bit rate allocation percentage thresholds, and determine a bit rate allocation percentage threshold interval of the average value of the percentages.

S520: Determine, in a decreasing preset phase function that uses the plurality of bit rate allocation percentage thresholds as function jump points, a phase corresponding to the bit rate allocation percentage threshold interval.

S522: Obtain a preset ratio corresponding to the determined phase, and determine the obtained preset ratio as the ratio of the target bit rate of the intra-coded frame in the current group of video frame sequences to the single frame average bit rate.

The ratio is in negative correlation with the average value of the percentages.

S524: Obtain the single frame average bit rate; and obtain the target bit rate of the intra-coded frame according to the single frame average bit rate and the ratio.

The obtaining the single frame average bit rate includes: obtaining a preset target bit rate per second; obtaining a preset frame rate; and dividing the target bit rate per second by the frame rate, to obtain the single frame average bit rate.

S526: Determine a first ratio of a bit rate of the intra-coded frame included in the previous group of video frame sequences to an average bit rate of the inter-predicted frame included in the previous group of video frame sequences.

S528: Divide a quantization step of the intra-coded frame included in the previous group of video frame sequences by an average quantization step of the inter-predicted frame included in the previous group of video frame sequences, to obtain a second ratio.

S530: Obtain a bit rate ratio of the target bit rate of the intra-coded frame included in the current group of video frame sequences to an average target bit rate of the inter-predicted frame included in the current group of video frame sequences according to a product of the first ratio and the second ratio.

S532: Obtain a total target bit rate of the current group of video frame sequences; and obtain the target bit rate of the intra-coded frame in the current group of video frame sequences according to the total target bit rate and the bit rate ratio.

S534: Code the intra-coded frame according to the target bit rate, and send, by using the video call application, a coded video stream obtained after coding to a video call peer end for decoding and play.

According to the foregoing video coding processing method, when the intra-coded frame in the current group of video frame sequences is coded, whether the current video scene changes is determined according to the percentage of the intra-prediction blocks in the inter-predicted frame selected in the previous group of video frame sequences. When it is determined that the current video scene changes, the target bit rate of the intra-coded frame in the current group of video frame sequences is determined according to the percentage of the intra-prediction blocks. The percentage of the intra-prediction blocks can reflect the strength of a correlation between images, and target bit rate allocation of the intra-coded frame in the current group of video frame sequences is determined according to the percentage of the intra-prediction blocks that can reflect the strength of the correlation between images, so that when the current video scene changes, the target bit rate allocation for the intra-coded frame in the current group of video frame sequences is more accurate, thereby improving adaptive coding capabilities.

Secondly, the average value of the percentages of the intra-prediction blocks in the inter-predicted frames is determined when it is determined, according to the percentage, that the current video scene changes. The average value of the percentages can reflect strength of a correlation between images. If the average value of the percentages is relatively small, the scene is usually a static scene, and the correlation between images is relatively strong, and if the average value of the percentages is relatively large, the scene is usually a moving scene, and the correlation between images is relatively weak. The target bit rate of the intra-coded frame in the current group of video frame sequences is determined according to the average value of the percentages, the target bit rate being in negative correlation with the average value of the percentages. It may be understood that when the average value of the percentages is relatively small and the correlation between images is relatively strong, a bit rate required by the inter-predicted frame is relatively low. In this case, the bit rate of the intra-coded frame may be improved, to facilitate improving the entire compression efficiency of the video. When the average value of the percentages is relatively large, and the correlation between images is relatively weak, the bit rate required by the inter-predicted frame is relatively high. In this case, the bit rate of the intra-coded frame may be reduced.

Then, by determining the phase corresponding to the average value of the percentages in the decreasing preset phase function, obtaining the preset ratio corresponding to the determined phase, and determining the obtained preset ratio as the ratio of the target bit rate of the intra-coded frame in the current group of video frame sequences to the single frame average bit rate without performing complex calculation, the ratio of the target bit rate of the intra-coded frame in the current group of video frame sequences to the single frame average bit rate can be quickly and accurately determined, to quickly determine the target bit rate, thereby improving the video coding efficiency.

Finally, the current group of video frame sequences is obtained by using the video call application, and the target bit rate of the current group of video frame sequences is determined according to the percentage of the intra-prediction blocks in the inter-predicted frame in the previous group of video frame sequences, and coding is performed on this basis. The computing device sends, by using the video call application, the coded video stream that is coded according to the foregoing method to the video call peer end for decoding and play, so that adaptive coding capabilities of the video real-time call are stronger, thereby improving the quality of the video real-time call.

Figure 6:
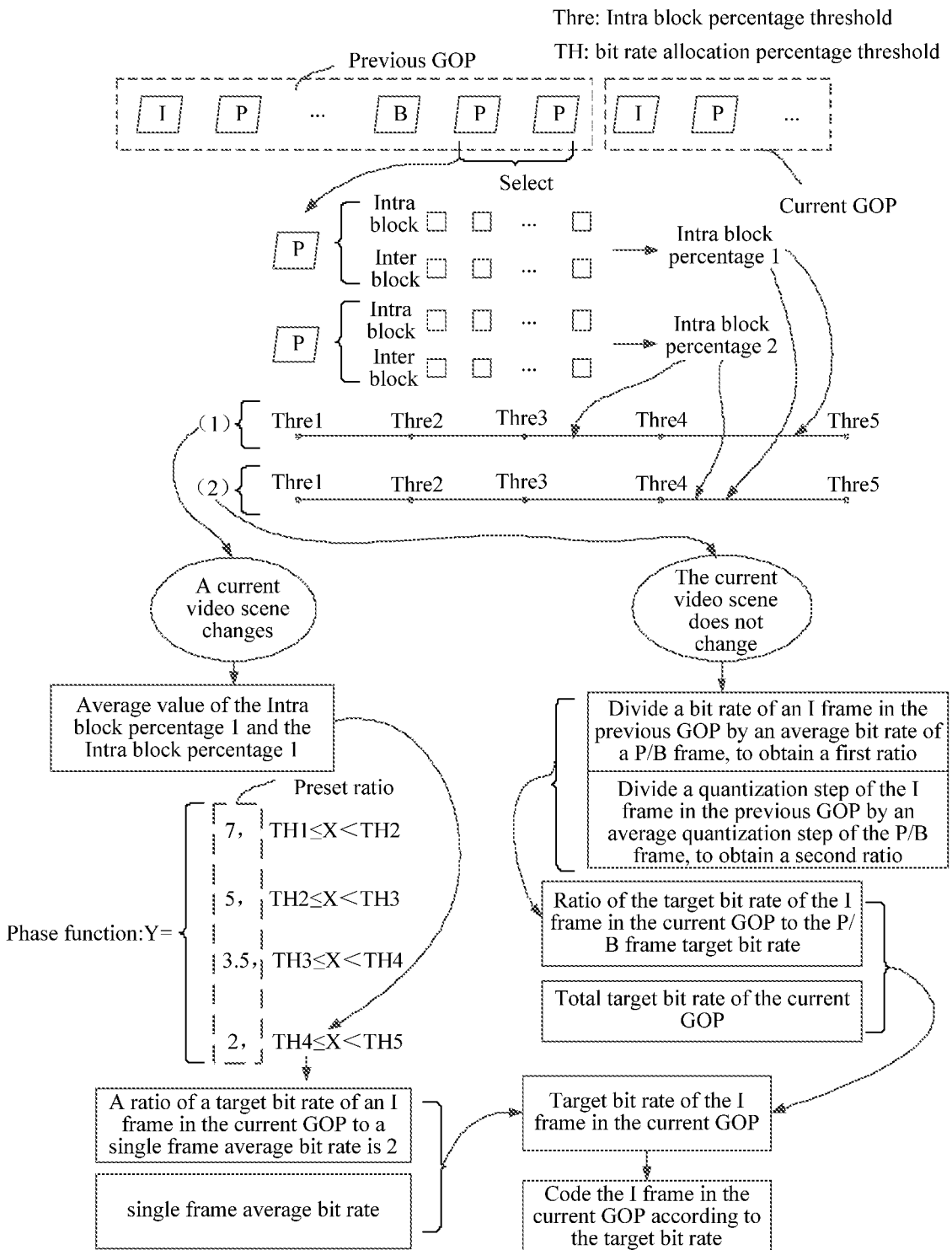
FIG. 6 is a schematic diagram of a principle of a video coding processing method in an embodiment.

FIG. 6 is a schematic diagram of a principle of a video coding processing method in an embodiment. Referring to FIG. 6, a current GOP (namely, the current group of video frame sequences) and a previous GOP (namely, the previous group of video frame sequences) are all video frame sequences formed by I frames (namely, the intra-coded frames) and P/B frames (P/B frames indicate P frames and/or B frames, and it may be understood that P frames and B frames are both inter-predicted frames).

The computing device may select the inter-predicted frames from the previous GOP in ascending order of distances from the current GOP. For example, in FIG. 6, two P frames are selected based on a principle of proximity. Each P frame includes an Intra block (intra-prediction block) and an Inter block (inter-prediction block). The computing device may separately determine percentages of Intra blocks in the selected P frames, to obtain an Intra block percentage 1 and an Intra block percentage 2. The computing device may separately compare the Intra block percentage 1 and the Intra block percentage 2 with a plurality of preset Thres (namely, the Intra block percentage threshold). When a comparison result is the first case in FIG. 6, namely, a Thre 4 exists between the Intra block percentage 1 and the Intra block percentage 2, it is determined that the current video scene changes. When the comparison result is the second case in FIG. 6, namely, the Intra block percentage 1 and the Intra block percentage 2 are between adjacent Thre 4 and Thre 5, it is determined that the current video scene does not change.

When the current video scene changes, the computing device may determine an average value of the Intra block percentage 1 and the Intra block percentage 2, and compare the average value with a plurality of preset THs (namely, the bit rate allocation percentage thresholds), to determine a phase corresponding to the average value in a decreasing preset phase function Y that uses the plurality of THs as jump points. It may be understood that two THs adjacent in size correspond to a phase of the preset phase function. Therefore, a phase corresponding to the average value in the preset phase function may be determined by comparing the average value with the plurality of preset THs. Each phase in the preset phase function has a corresponding preset ratio. As shown in FIG. 6, the average value corresponds to a phase greater than or equal to the TH 4 and less than the TH 5, and the computing device may obtain a preset ratio 2 corresponding to the phase greater than or equal to the TH 4 and less than the TH 5. The preset ratio 2 is used as a ratio of the target bit rate of the I frame in the current GOP to the single frame average bit rate. The computing device may obtain the single frame average bit rate, and obtain the target bit rate of the I frame in the current GOP with reference to the ratio.

When the current video scene does not change, the computing device may divide the bit rate of the I frame in the previous GOP by the average bit rate of the P/B frame, to obtain the first ratio, and divide the quantization step of the I frame in the previous GOP by the average quantization step of the P/B frame, to obtain the second ratio, and obtain the ratio of the target bit rate of the I frame in the current GOP to the target bit rate of the P/B frame according to the first ratio and the second ratio. The computing device may obtain the total target bit rate of the current GOP, and obtain the target bit rate of the I frame in the current GOP with reference to the ratio of the target bit rate of the I frame in the current GOP to the target bit rate of the P/B frame.

The computing device may code the I frame in the current GOP according to the obtained target bit rate in the current GOP.

In an embodiment, a computing device is provided. An internal structure of the computing device may be shown in FIG. 10. The computing device includes a video coding processing apparatus. The video coding processing apparatus includes various modules, and each module may be entirely or partially implemented by software, hardware, or a combination thereof.

Figure 7:
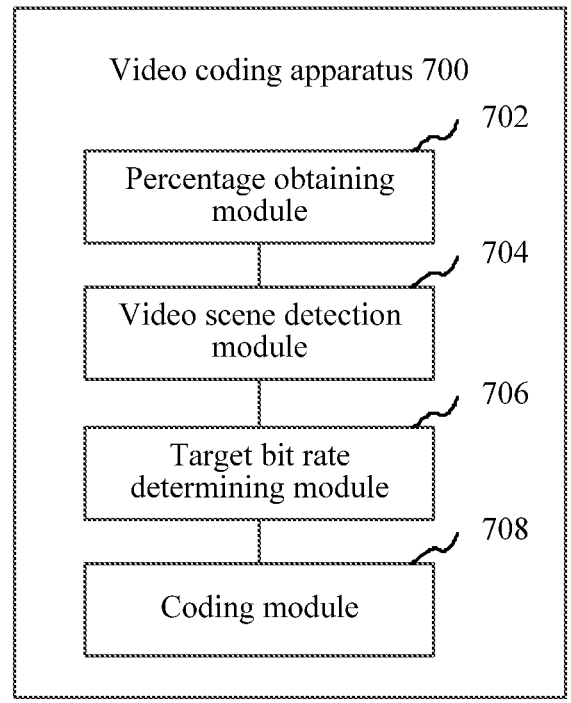
FIG. 7 is a block diagram of a video coding processing apparatus in an embodiment.

As shown in FIG. 7, in an embodiment, a video coding processing apparatus 700 is provided. The apparatus 700 includes: a percentage obtaining module 702, a video scene detection module 704, a target bit rate determining module 706, and a coding module 708.

The percentage obtaining module 702 is configured to obtain a percentage of intra-prediction blocks in an inter-predicted frame in a previous group of video frame sequences.

The video scene detection module 704 is configured to determine, according to the percentage, whether a current video scene changes.

The target bit rate determining module 706 is configured to: determine a target bit rate of an intra-coded frame in a current group of video frame sequences according to the percentage when the video scene detection module 704 determines that the current video scene changes.

The coding module 708 is configured to code the intra-coded frame according to the target bit rate.

In an embodiment, the inter-predicted frames selected are a plurality of continuous inter-predicted frames. The target bit rate determining module 706 is further configured to: determine an average value of percentages of intra-prediction blocks in the inter-predicted frames when determining, according to the percentage, that the current video scene changes; and determine the target bit rate of the intra-coded frame in the current group of video frame sequences according to the average value of the percentages, the target bit rate being in negative correlation with the average value of the percentages.

Figure 8:
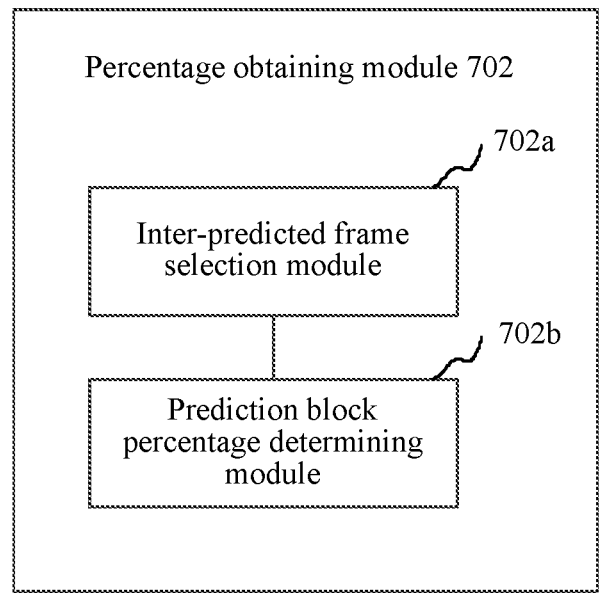
FIG. 8 is a block diagram of a percentage obtaining module in an embodiment.

As shown in FIG. 8, in an embodiment, the percentage obtaining module 702 includes:

an inter-predicted frame selection module 702*a*, configured to: obtain a target selection quantity; and select continuous inter-predicted frames that meet the target selection quantity from the previous group of video frame sequences in ascending order of distances from the current group of video frame sequences; and a prediction block percentage determining module 702*b*, configured to obtain percentages of intra-prediction blocks in the inter-predicted frames.

In an embodiment, the inter-predicted frame selection module 702*a* is further configured to: determine a total quantity of inter-predicted frames in the previous group of video frame sequences; obtain a preset selection quantity; and determine the smaller one of the preset selection quantity and the determined total quantity as the target selection quantity.

In an embodiment, the inter-predicted frames selected are a plurality of continuous inter-predicted frames. The video scene detection module 704 is further configured to: determine the largest value and the smallest value of percentages of intra-prediction blocks in the inter-predicted frames; obtain a plurality of preset intra-prediction block percentage thresholds; and determine that the current video scene changes when at least one of the intra-prediction block percentage thresholds exists between the largest value and the smallest value.

In an embodiment, the video scene detection module 704 is further configured to: determine whether the largest value and the smallest value are between adjacent two of the intra-prediction block percentage thresholds; and determine that the current video scene does not change when the largest value and the smallest value are between adjacent two of the intra-prediction block percentage thresholds.

In an embodiment, the target bit rate determining module 706 is further configured to: determine a ratio of the target bit rate of the intra-coded frame in the current group of video frame sequences to a single frame average bit rate according to the average value of the percentages, the ratio being in negative correlation with the average value of the percentages; obtain the single frame average bit rate; and obtain the target bit rate of the intra-coded frame according to the single frame average bit rate and the ratio.

In an embodiment, the target bit rate determining module 706 is further configured to: determine a phase corresponding to the average value of the percentages in a decreasing preset phase function; obtain a preset ratio corresponding to the determined phase; and determine the obtained preset ratio as the ratio of the target bit rate of the intra-coded frame in the current group of video frame sequences to the single frame average bit rate.

In an embodiment, the target bit rate determining module 706 is further configured to: obtain a plurality of preset bit rate allocation percentage thresholds; separately compare the average value of the percentages with the plurality of preset bit rate allocation percentage thresholds, and determine a bit rate allocation percentage threshold interval of the average value of the percentages; and determine, in a decreasing preset phase function that uses the plurality of bit rate allocation percentage thresholds as function jump points, a phase corresponding to the bit rate allocation percentage threshold interval.

In an embodiment, the target bit rate determining module 706 is further configured to: obtain a preset target bit rate per second; obtain a preset frame rate; and divide the target bit rate per second by the frame rate, to obtain the single frame average bit rate.

In an embodiment, the target bit rate determining module 706 is further configured to: obtain an average quantization parameter of the inter-predicted frame of the previous group of video frame sequences when determining, according to the percentage, that the current video scene does not change; determine a quantization parameter of the intra-coded frame in the current group of video frame sequences according to the average quantization parameter and a preset quantization parameter offset; and code the intra-coded frame according to the quantization parameter.

In an embodiment, the target bit rate determining module 706 is further configured to: determine a first ratio of a bit rate of the intra-coded frame included in the previous group of video frame sequences to an average bit rate of the inter-predicted frame included in the previous group of video frame sequences when determining, according to the percentage, that the current video scene does not change; divide a quantization step of the intra-coded frame included in the previous group of video frame sequences by an average quantization step of the inter-predicted frame included in the previous group of video frame sequences, to obtain a second ratio; obtain a bit rate ratio of the target bit rate of the intra-coded frame included in the current group of video frame sequences to an average target bit rate of the inter-predicted frame included in the current group of video frame sequences according to a product of the first ratio and the second ratio; obtain a total target bit rate of the current group of video frame sequences; and obtain the target bit rate of the intra-coded frame in the current group of video frame sequences according to the total target bit rate and the bit rate ratio.

Figure 9:
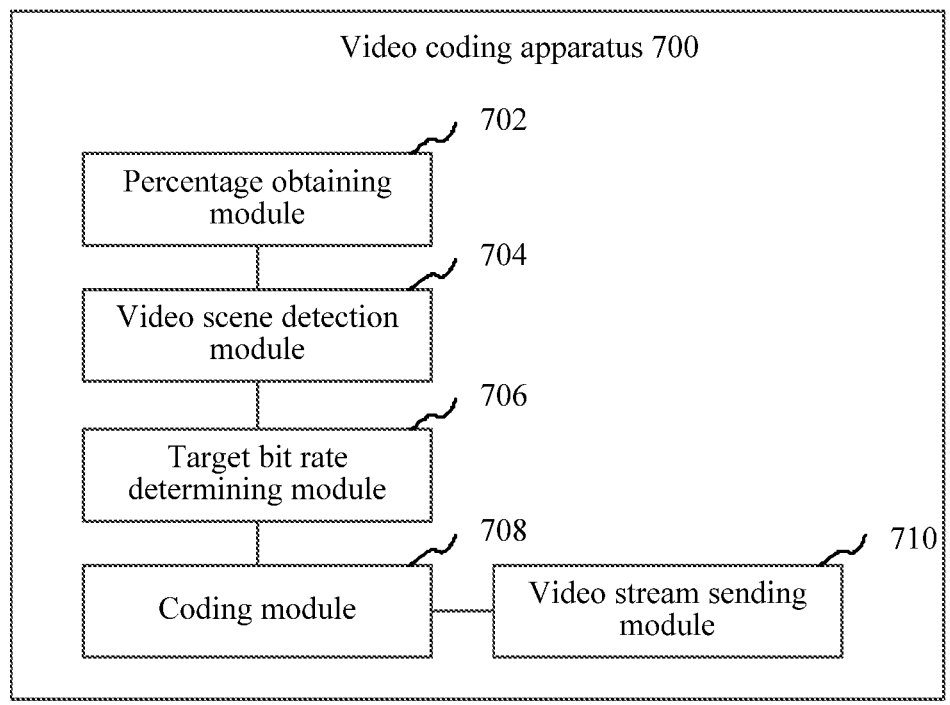
FIG. 9 is a block diagram of a video coding processing apparatus in another embodiment.

As shown in FIG. 9, in an embodiment, the current group of video frame sequences are video frame sequences obtained by using a video call application. The apparatus further includes:

a video stream sending module 710, configured to send, by using the video call application, a coded video stream obtained after coding to a video call peer end for decoding and play.

Figure 10:
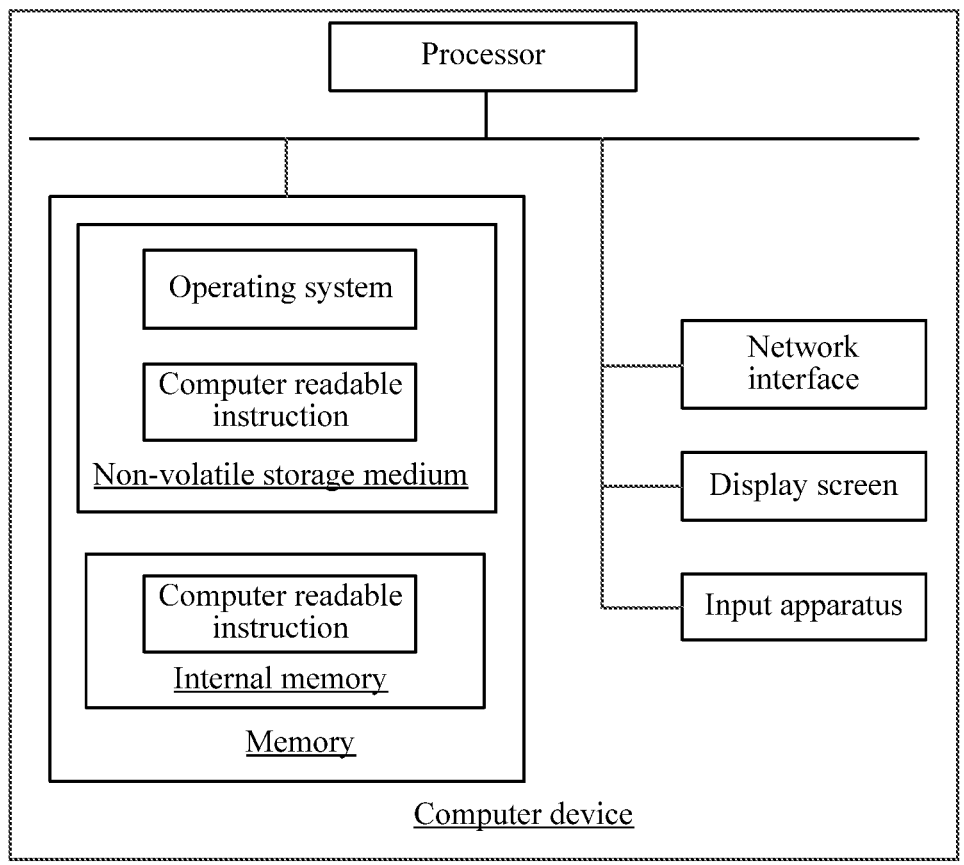
FIG. 10 is a block diagram of a computing device in an embodiment.

FIG. 10 is a block diagram of a computing device in an embodiment. Referring to FIG. 10, the computing device may be the first terminal 110 or the second terminal 120 shown in FIG. 1. The computing device includes a processor, a memory, a network interface, a display screen, and an input apparatus that are connected by using a system bus. The memory includes a non-volatile storage medium and an internal memory. The non-volatile storage medium may be a non-volatile readable storage medium. The non-volatile storage medium of the computing device may store an operating system and a computer readable instruction. When executed, the computer readable instruction can enable the processor to perform a video coding processing method. The processor of the computing device is configured to provide computing and control capabilities, to support running of the entire computing device. The internal memory may also store a computer readable instruction. When executed by the processor, the computer readable instruction may cause the processor to perform a video coding processing method. The network interface of the computing device is configured to perform network communication. The display screen of the computing device may be a liquid crystal display screen, an e-ink display screen, or the like. The input apparatus of the computing device may be a touch layer covering the display screen, or may be a key, a track ball, or a touchpad disposed on a housing of the terminal, or may be an external keyboard, touchpad, or mouse. The computing device may be a personal computer, a mobile terminal, or an in-vehicle device. The mobile terminal includes at least one of a mobile phone, a tablet computer, a personal digital assistant, a wearable device, or the like.

A person skilled in the art may understand that, in the structure shown in FIG. 10, only a block diagram of a partial structure related to a solution in this application is shown, and does not constitute a limit to the computing device to which the solution in this application is applied. Specifically, the computing device may include more components or fewer components than those shown in the figure, or some components may be combined, or a different component deployment may be used.

In an embodiment, the video coding processing apparatus provided in this application may be implemented as a form of a computer readable instruction. The computer readable instruction may run on the computing device shown in FIG. 10. A non-volatile storage medium of the computing device may store program modules that form the video coding processing apparatus, such as the percentage obtaining module 702, the video scene detection module 704, the target bit rate determining module 706, and the coding module 708 that are shown in FIG. 7. The computer readable instruction formed by the program modules is used to cause the computing device to perform steps in the video coding processing methods in the embodiments of this application that are described in this specification. For example, the computing device may obtain percentages of intra-prediction blocks in inter-predicted frames in a previous group of video frame sequences by using the percentage obtaining module 702 in the video coding processing apparatus 700 shown in FIG. 7. The computing device may determine, by using the video scene detection module 704 according to the percentage, whether a current video scene changes, and determine a target bit rate of an intra-coded frame in a current group of video frame sequences according to the percentage by using the target bit rate determining module 706 when it is determined that the current video scene changes. The computing device may code the intra-coded frame according to the target bit rate by using the coding module 708.

In an embodiment, a computing device is provided, including a memory and a processor, the memory storing a computer readable instruction, and the computer readable instruction, when executed by the processor, causing the processor to perform the following steps:

obtaining a percentage of intra-prediction blocks in an inter-predicted frame in a previous group of video frame sequences;

determining, according to the percentage, whether a current video scene changes, and determining a target bit rate of an intra-coded frame in a current group of video frame sequences according to the percentage when determining that the current video scene changes; and coding the intra-coded frame according to the target bit rate.

In an embodiment, the inter-predicted frames selected are a plurality of continuous inter-predicted frames; and the determining a target bit rate of an intra-coded frame in a current group of video frame sequences according to the percentage when determining that the current video scene changes includes:

when determining, according to the percentage, that the current video scene changes, determining an average value of percentages of intra-prediction blocks in the inter-predicted frames; and determining the target bit rate of the intra-coded frame in the current group of video frame sequences according to the average value of the percentages, the target bit rate being in negative correlation with the average value of the percentages.

In an embodiment, the obtaining a percentage of intra-prediction blocks in an inter-predicted frame in a previous group of video frame sequences includes:

obtaining a target selection quantity;

selecting continuous inter-predicted frames that meet the target selection quantity from the previous group of video frame sequences in ascending order of distances from the current group of video frame sequences; and obtaining percentages of intra-prediction blocks in the inter-predicted frames.

In an embodiment, the obtaining a target selection quantity includes:

determining a total quantity of inter-predicted frames in the previous group of video frame sequences;

obtaining a preset selection quantity; and determining the smaller one of the preset selection quantity and the determined total quantity as the target selection quantity.

In an embodiment, the inter-predicted frames selected are a plurality of continuous inter-predicted frames; and the determining, according to the percentage, whether a current video scene changes includes:

determining the largest value and the smallest value of percentages of intra-prediction blocks in the inter-predicted frames;

obtaining a plurality of preset intra-prediction block percentage thresholds; and determining that the current video scene changes when at least one of the intra-prediction block percentage thresholds exists between the largest value and the smallest value.

In an embodiment, the determining, according to the percentage, whether a current video scene changes further includes:

determining whether the largest value and the smallest value are between adjacent two of the intra-prediction block percentage thresholds; and determining that the current video scene does not change when the largest value and the smallest value are between adjacent two of the intra-prediction block percentage thresholds.

In an embodiment, the determining a target bit rate of an intra-coded frame in a current group of video frame sequences according to the percentage includes:

determining a ratio of the target bit rate of the intra-coded frame in the current group of video frame sequences to a single frame average bit rate according to the average value of the percentages, the ratio being in negative correlation with the average value of the percentages;

obtaining the single frame average bit rate; and obtaining the target bit rate of the intra-coded frame according to the single frame average bit rate and the ratio.

In an embodiment, the determining a ratio of the target bit rate of the intra-coded frame in the current group of video frame sequences to a single frame average bit rate according to the average value of the percentages includes:

determining a phase corresponding to the average value of the percentages in a decreasing preset phase function;

obtaining a preset ratio corresponding to the determined phase; and determining the obtained preset ratio as the ratio of the target bit rate of the intra-coded frame in the current group of video frame sequences to the single frame average bit rate.

In an embodiment, the determining a phase corresponding to the average value of the percentages in a decreasing preset phase function includes:

obtaining a plurality of preset bit rate allocation percentage thresholds;

separately comparing the average value of the percentages with the plurality of preset bit rate allocation percentage thresholds, and determining a bit rate allocation percentage threshold interval of the average value of the percentages; and determining, in a decreasing preset phase function that uses the plurality of bit rate allocation percentage thresholds as function jump points, a phase corresponding to the bit rate allocation percentage threshold interval.

In an embodiment, the obtaining the single frame average bit rate includes:

obtaining a preset target bit rate per second;

obtaining a preset frame rate; and dividing the target bit rate per second by the frame rate, to obtain the single frame average bit rate.

In an embodiment, the computer readable instruction further causes the processor to perform the following steps:

when determining, according to the percentage, that the current video scene does not change, obtaining an average quantization parameter of the inter-predicted frame of the previous group of video frame sequences;

determining a quantization parameter of the intra-coded frame in the current group of video frame sequences according to the average quantization parameter and a preset quantization parameter offset; and coding the intra-coded frame according to the quantization parameter.

In an embodiment, the computer readable instruction further causes the processor to perform the following steps:

when determining, according to the percentage, that the current video scene does not change, determining a first ratio of a bit rate of the intra-coded frame included in the previous group of video frame sequences to an average bit rate of the inter-predicted frame included in the previous group of video frame sequences;

dividing a quantization step of the intra-coded frame included in the previous group of video frame sequences by an average quantization step of the inter-predicted frame included in the previous group of video frame sequences, to obtain a second ratio.

obtaining a bit rate ratio of the target bit rate of the intra-coded frame included in the current group of video frame sequences to an average target bit rate of the inter-predicted frame included in the current group of video frame sequences according to a product of the first ratio and the second ratio;

obtaining a total target bit rate of the current group of video frame sequences; and obtaining the target bit rate of the intra-coded frame in the current group of video frame sequences according to the total target bit rate and the bit rate ratio.

In an embodiment, the current group of video frame sequences are video frame sequences obtained by using a video call application; and the computer readable instruction further causes the processor to perform the following step: sending, by using the video call application, a coded video stream obtained after coding to a video call peer end for decoding and play.

In an embodiment, a storage medium storing a computer executable instruction is provided, the computer executable instruction, when executed by one or more processors, causing the one or more processors to perform the following steps:

obtaining a percentage of intra-prediction blocks in an inter-predicted frame in a previous group of video frame sequences;

determining, according to the percentage, whether a current video scene changes, and determining a target bit rate of an intra-coded frame in a current group of video frame sequences according to the percentage when determining that the current video scene changes; and coding the intra-coded frame according to the target bit rate.

In an embodiment, the inter-predicted frames selected are a plurality of continuous inter-predicted frames; and the determining a target bit rate of an intra-coded frame in a current group of video frame sequences according to the percentage when determining that the current video scene changes includes:

when determining, according to the percentage, that the current video scene changes, determining an average value of percentages of intra-prediction blocks in the inter-predicted frames; and determining the target bit rate of the intra-coded frame in the current group of video frame sequences according to the average value of the percentages, the target bit rate being in negative correlation with the average value of the percentages.

In an embodiment, the obtaining a percentage of intra-prediction blocks in an inter-predicted frame in a previous group of video frame sequences includes:

obtaining a target selection quantity;

selecting continuous inter-predicted frames that meet the target selection quantity from the previous group of video frame sequences in ascending order of distances from the current group of video frame sequences; and obtaining percentages of intra-prediction blocks in the inter-predicted frames.

In an embodiment, the obtaining a target selection quantity includes:

determining a total quantity of inter-predicted frames in the previous group of video frame sequences;

obtaining a preset selection quantity; and determining the smaller one of the preset selection quantity and the determined total quantity as the target selection quantity.

In an embodiment, the inter-predicted frames selected are a plurality of continuous inter-predicted frames; and the determining, according to the percentage, whether a current video scene changes includes:

determining the largest value and the smallest value of percentages of intra-prediction blocks in the inter-predicted frames;

obtaining a plurality of preset intra-prediction block percentage thresholds; and determining that the current video scene changes when at least one of the intra-prediction block percentage thresholds exists between the largest value and the smallest value.

In an embodiment, the determining, according to the percentage, whether a current video scene changes further includes:

determining whether the largest value and the smallest value are between adjacent two of the intra-prediction block percentage thresholds; and determining that the current video scene does not change when the largest value and the smallest value are between adjacent two of the intra-prediction block percentage thresholds.

In an embodiment, the determining a target bit rate of an intra-coded frame in a current group of video frame sequences according to the percentage includes:

determining a ratio of the target bit rate of the intra-coded frame in the current group of video frame sequences to a single frame average bit rate according to the average value of the percentages, the ratio being in negative correlation with the average value of the percentages;

obtaining the single frame average bit rate; and obtaining the target bit rate of the intra-coded frame according to the single frame average bit rate and the ratio.

In an embodiment, the determining a ratio of the target bit rate of the intra-coded frame in the current group of video frame sequences to a single frame average bit rate according to the average value of the percentages includes:

determining a phase corresponding to the average value of the percentages in a decreasing preset phase function;

obtaining a preset ratio corresponding to the determined phase; and determining the obtained preset ratio as the ratio of the target bit rate of the intra-coded frame in the current group of video frame sequences to the single frame average bit rate.

In an embodiment, the determining a phase corresponding to the average value of the percentages in a decreasing preset phase function includes:

obtaining a plurality of preset bit rate allocation percentage thresholds;

separately comparing the average value of the percentages with the plurality of preset bit rate allocation percentage thresholds, and determining a bit rate allocation percentage threshold interval of the average value of the percentages; and determining, in a decreasing preset phase function that uses the plurality of bit rate allocation percentage thresholds as function jump points, a phase corresponding to the bit rate allocation percentage threshold interval.

In an embodiment, the obtaining the single frame average bit rate includes:

obtaining a preset target bit rate per second;

obtaining a preset frame rate; and dividing the target bit rate per second by the frame rate, to obtain the single frame average bit rate.

In an embodiment, the computer readable instruction further causes the processor to perform the following steps:

when determining, according to the percentage, that the current video scene does not change, obtaining an average quantization parameter of the inter-predicted frame of the previous group of video frame sequences;

determining a quantization parameter of the intra-coded frame in the current group of video frame sequences according to the average quantization parameter and a preset quantization parameter offset; and coding the intra-coded frame according to the quantization parameter.

In an embodiment, the computer readable instruction further causes the processor to perform the following steps:

when determining, according to the percentage, that the current video scene does not change, determining a first ratio of a bit rate of the intra-coded frame included in the previous group of video frame sequences to an average bit rate of the inter-predicted frame included in the previous group of video frame sequences;

dividing a quantization step of the intra-coded frame included in the previous group of video frame sequences by an average quantization step of the inter-predicted frame included in the previous group of video frame sequences, to obtain a second ratio;

obtaining a bit rate ratio of the target bit rate of the intra-coded frame included in the current group of video frame sequences to an average target bit rate of the inter-predicted frame included in the current group of video frame sequences according to a product of the first ratio and the second ratio;

obtaining a total target bit rate of the current group of video frame sequences; and obtaining the target bit rate of the intra-coded frame in the current group of video frame sequences according to the total target bit rate and the bit rate ratio.

In an embodiment, the current group of video frame sequences are video frame sequences obtained by using a video call application; and the computer readable instruction further causes the processor to perform the following step: sending, by using the video call application, a coded video stream obtained after coding to a video call peer end for decoding and play.

It should be understood that the steps in the embodiments of this application are not necessarily performed sequentially in the order indicated by the step labels. Unless explicitly stated in this specification, the execution of these steps is not strictly sequential, and these steps may be executed in another sequence. Moreover, at least some of the steps in each embodiment may include a plurality of sub-steps or stages, which may not necessarily be completed at the same moment, but may be performed at different moments. These sub-steps or stages are not necessarily performed in sequence, but may be performed in turn or alternately with at least some of other steps or sub-steps or stages of the other steps.

A person of ordinary skill in the art may understand that all or some of the processes of the methods in the foregoing embodiments may be implemented by a computer readable instruction instructing relevant hardware. The program may be stored in a non-volatile computer-readable storage medium. When the program is run, the processes of the foregoing methods in the embodiments are performed. Any reference to a memory, storage, database or other medium used in the various embodiments provided herein may include non-volatile and/or volatile memory. Non-volatile memory can include read only memory (ROM), programmable ROM (PROM), electrically programmable ROM (EPROM), electrically erasable programmable ROM (EEPROM), or flash memory. The volatile memory may include a random access memory (RAM) or an external cache. By way of illustration and not limitation, RAM is available in a variety of formats, such as static RAM (SRAM), dynamic RAM (DRAM), synchronous DRAM (SDRAM), dual data rate SDRAM (DDRSDRAM), enhanced SDRAM (ESDRAM), synchronization chain. Synchlink DRAM (SLDRAM), Memory Bus (Rambus) Direct RAM (RDRAM), Direct Memory Bus Dynamic RAM (DRDRAM), and Memory Bus Dynamic RAM (RDRAM).

Technical features of the foregoing embodiments may be randomly combined. To make description concise, not all possible combinations of the technical features in the foregoing embodiments are described. However, as long as combinations of these technical features do not contradict each other, it should be considered that the combinations all fall within the scope recorded by this specification.

The foregoing embodiments only describe several implementations of this application, which are described specifically and in detail, and therefore cannot be construed as a limitation to the patent scope of the present disclosure. It should be noted that, a person of ordinary skill in the art may make various changes and improvements without departing from the ideas of this application, which shall all fall within the protection scope of this application. Therefore, the protection scope of the patent of this application shall be subject to the appended claims.

What is claimed is:

1. A video coding processing method performed at a computing device having one or more processors and memory storing a plurality of programs to be executed by the one or more processors, the method comprising:
   obtaining, by the computing device, a percentage of intra-prediction blocks in an inter-predicted frame in a previous group of video frame sequences;
   determining, by the computing device according to the percentage, whether a current video scene changes;
   in accordance with a determination that the current video scene changes, determining, by the computing device, a target bit rate of an intra-coded frame in a current group of video frame sequences according to the percentage;
   coding, by the computing device, the intra-coded frame according to the target bit rate;
   obtaining, by the computing device, an average quantization parameter of the inter-predicted frame of the previous group of video frame sequences when determining, according to the percentage, that the current video scene does not change;
   determining, by the computing device, a quantization parameter of the intra-coded frame in the current group of video frame sequences according to the average quantization parameter and a preset quantization parameter offset; and
   coding, by the computing device, the intra-coded frame according to the quantization parameter.

2. The method according to claim 1, wherein the inter-predicted frame is selected from a plurality of continuous inter-predicted frames; and
   the operation of determining a target bit rate of an intra-coded frame in a current group of video frame sequences according to the percentage further comprises:
   determining, by the computing device, an average value of percentages of intra-prediction blocks in the inter-predicted frame after determining, according to the percentage, that the current video scene changes; and
   determining, by the computing device, the target bit rate of the intra-coded frame in the current group of video frame sequences according to the average value of the percentages, the target bit rate being in negative correlation with the average value of the percentages.

3. The method according to claim 1, wherein the operation of obtaining, by a computing device, a percentage of intra-prediction blocks in an inter-predicted frame in a previous group of video frame sequences comprises:
   obtaining, by the computing device, a target selection quantity;
   selecting, by the computing device, continuous inter-predicted frames that meet the target selection quantity from the previous group of video frame sequences in ascending order of distances from the current group of video frame sequences; and
   obtaining, by the computing device, percentages of intra-prediction blocks in the inter-predicted frames.

4. The method according to claim 3, wherein the operation of obtaining, by the computing device, a target selection quantity comprises:
   determining, by the computing device, a total quantity of inter-predicted frames in the previous group of video frame sequences;
   obtaining, by the computing device, a preset selection quantity; and
   determining, by the computing device, a smaller one of the preset selection quantity and the determined total quantity as the target selection quantity.

5. The method according to claim 1, wherein the inter-predicted frame is selected from a plurality of continuous inter-predicted frames; and
   the operation of determining, by the computing device according to the percentage, whether a current video scene changes further comprises:
   determining, by the computing device, the largest value and the smallest value of percentages of intra-prediction blocks in the inter-predicted frames;
   obtaining, by the computing device, a plurality of preset intra-prediction block percentage thresholds; and
   determining, by the computing device, that the current video scene changes when at least one of the intra-prediction block percentage thresholds exists between the largest value and the smallest value.

6. The method according to claim 5, wherein the operation of determining, by the computing device according to the percentage, whether a current video scene changes further comprises:
   determining, by the computing device, whether the largest value and the smallest value are between adjacent two of the intra-prediction block percentage thresholds; and
   determining, by the computing device, that the current video scene does not change when the largest value and the smallest value are between adjacent two of the intra-prediction block percentage thresholds.

7. The method according to claim 1, wherein the operation of determining a target bit rate of an intra-coded frame in a current group of video frame sequences according to the percentage comprises:
   determining, by the computing device, a ratio of the target bit rate of the intra-coded frame in the current group of video frame sequences to a single frame average bit rate according to the average value of the percentages, the ratio being in negative correlation with the average value of the percentages;
   obtaining, by the computing device, the single frame average bit rate; and
   obtaining, by the computing device, the target bit rate of the intra-coded frame according to the single frame average bit rate and the ratio.

8. The method according to claim 7, wherein the operation of determining, by the computing device, a ratio of the target bit rate of the intra-coded frame in the current group of video frame sequences to a single frame average bit rate according to the average value of the percentages further comprises:

determining, by the computing device, a phase corresponding to the average value of the percentages in a decreasing preset phase function;

obtaining, by the computing device, a preset ratio corresponding to the determined phase; and determining, by the computing device, the obtained preset ratio as the ratio of the target bit rate of the intra-coded frame in the current group of video frame sequences to the single frame average bit rate.

9. The method according to claim 8, wherein the operation of determining, by the computing device, a phase corresponding to the average value of the percentages in a decreasing preset phase function further comprises:

obtaining, by the computing device, a plurality of preset bit rate allocation percentage thresholds;

separately comparing, by the computing device, the average value of the percentages with the plurality of preset bit rate allocation percentage thresholds, and determining a bit rate allocation percentage threshold interval of the average value of the percentages; and determining, by the computing device in a decreasing preset phase function that uses the plurality of bit rate allocation percentage thresholds as function jump points, a phase corresponding to the bit rate allocation percentage threshold interval.

10. The method according to claim 7, wherein the operation of obtaining, by the computing device, the single frame average bit rate comprises:

obtaining, by the computing device, a preset target bit rate per second;

obtaining, by the computing device, a preset frame rate; and dividing, by the computing device, the target bit rate per second by the frame rate, to obtain the single frame average bit rate.

11. The method according to claim 1, further comprising:

determining, by the computing device, a first ratio of a bit rate of the intra-coded frame comprised in the previous group of video frame sequences to an average bit rate of the inter-predicted frame comprised in the previous group of video frame sequences when determining, according to the percentage, that the current video scene does not change;

dividing, by the computing device, a quantization step of the intra-coded frame comprised in the previous group of video frame sequences by an average quantization step of the inter-predicted frame comprised in the previous group of video frame sequences, to obtain a second ratio;

obtaining, by the computing device, a bit rate ratio of the target bit rate of the intra-coded frame comprised in the current group of video frame sequences to an average target bit rate of the inter-predicted frame comprised in the current group of video frame sequences according to a product of the first ratio and the second ratio;

obtaining, by the computing device, a total target bit rate of the current group of video frame sequences; and obtaining, by the computing device, the target bit rate of the intra-coded frame in the current group of video frame sequences according to the total target bit rate and the bit rate ratio.

12. The method according to claim 1, wherein the current group of video frame sequences are video frame sequences obtained by using a video call application; and the method further comprises:

sending, by the computing device by using the video call application, a coded video stream obtained after coding to a video call peer end for decoding and play.

13. A computing device, comprising memory and one or more processors, the memory storing a plurality of computer readable instructions that, when executed by the one or more processors, cause the computing device to perform a plurality of operations comprising:

obtaining, by the computing device, a percentage of intra-prediction blocks in an inter-predicted frame in a previous group of video frame sequences;

determining, by the computing device according to the percentage, whether a current video scene changes;

in accordance with a determination that the current video scene changes, determining, by the computing device, a target bit rate of an intra-coded frame in a current group of video frame sequences according to the percentage;

coding, by the computing device, the intra-coded frame according to the target bit rate;

obtaining, by the computing device, an average quantization parameter of the inter-predicted frame of the previous group of video frame sequences when determining, according to the percentage, that the current video scene does not change;

determining, by the computing device, a quantization parameter of the intra-coded frame in the current group of video frame sequences according to the average quantization parameter and a preset quantization parameter offset; and coding, by the computing device, the intra-coded frame according to the quantization parameter.

14. The computing device according to claim 13, wherein the inter-predicted frame is selected from a plurality of continuous inter-predicted frames; and the operation of determining a target bit rate of an intra-coded frame in a current group of video frame sequences according to the percentage further comprises:

determining, by the computing device, an average value of percentages of intra-prediction blocks in the inter-predicted frame after determining, according to the percentage, that the current video scene changes; and determining, by the computing device, the target bit rate of the intra-coded frame in the current group of video frame sequences according to the average value of the percentages, the target bit rate being in negative correlation with the average value of the percentages.

15. The computing device according to claim 13, wherein the operation of obtaining, by a computing device, a percentage of intra-prediction blocks in an inter-predicted frame in a previous group of video frame sequences comprises:

obtaining, by the computing device, a target selection quantity;

selecting, by the computing device, continuous inter-predicted frames that meet the target selection quantity from the previous group of video frame sequences in ascending order of distances from the current group of video frame sequences; and obtaining, by the computing device, percentages of intra-prediction blocks in the inter-predicted frames.

16. The computing device according to claim 13, wherein the inter-predicted frame is selected from a plurality of continuous inter-predicted frames; and the operation of determining, by the computing device according to the percentage, whether a current video scene changes further comprises:
  determining, by the computing device, the largest value and the smallest value of percentages of intra-prediction blocks in the inter-predicted frames;
  obtaining, by the computing device, a plurality of preset intra-prediction block percentage thresholds; and
  determining, by the computing device, that the current video scene changes when at least one of the intra-prediction block percentage thresholds exists between the largest value and the smallest value.

17. The computing device according to claim 13, wherein the operation of determining a target bit rate of an intra-coded frame in a current group of video frame sequences according to the percentage comprises:
  determining, by the computing device, a ratio of the target bit rate of the intra-coded frame in the current group of video frame sequences to a single frame average bit rate according to the average value of the percentages, the ratio being in negative correlation with the average value of the percentages;
  obtaining, by the computing device, the single frame average bit rate; and
  obtaining, by the computing device, the target bit rate of the intra-coded frame according to the single frame average bit rate and the ratio.

18. A non-transitory computer readable storage medium storing a plurality of instructions in connection with a computing device having one or more processors, wherein the plurality of instructions, when executed by the one or more processors, cause the computing device to perform a plurality of operations comprising:
  obtaining, by the computing device, a percentage of intra-prediction blocks in an inter-predicted frame in a previous group of video frame sequences;
  determining, by the computing device according to the percentage, whether a current video scene changes;
  in accordance with a determination that the current video scene changes, determining, by the computing device, a target bit rate of an intra-coded frame in a current group of video frame sequences according to the percentage;
  coding, by the computing device, the intra-coded frame according to the target bit rate;
  obtaining, by the computing device, an average quantization parameter of the inter-predicted frame of the previous group of video frame sequences when determining, according to the percentage, that the current video scene does not change;
  determining, by the computing device, a quantization parameter of the intra-coded frame in the current group of video frame sequences according to the average quantization parameter and a preset quantization parameter offset; and
  coding, by the computing device, the intra-coded frame according to the quantization parameter.

* * * * *